(12) United States Patent
Vantrease

(10) Patent No.: US 11,279,076 B2
(45) Date of Patent: Mar. 22, 2022

(54) FORMER TO TRIM PRESS AUTOMATED SHEET DELIVERY SYSTEM AND METHOD

(71) Applicant: Irwin Research and Development, Inc., Yakima, WA (US)

(72) Inventor: Dale L. Vantrease, Naches, WA (US)

(73) Assignee: Irwin Research and Development, Inc., Yakima, WA (US)

( * ) Notice: Subject to any disclaimer, the term of this patent is extended or adjusted under 35 U.S.C. 154(b) by 45 days.

(21) Appl. No.: 16/237,416

(22) Filed: Dec. 31, 2018

(65) Prior Publication Data
US 2019/0202107 A1 Jul. 4, 2019

Related U.S. Application Data

(60) Provisional application No. 62/611,901, filed on Dec. 29, 2017.

(51) Int. Cl.
| | |
|---|---|
| *B29C 51/26* | (2006.01) |
| *B29C 51/10* | (2006.01) |
| *B29C 51/42* | (2006.01) |
| *B29C 51/44* | (2006.01) |

(52) U.S. Cl.
CPC ........ *B29C 51/262* (2013.01); *B29C 51/261* (2013.01); *B29C 51/268* (2013.01); *B29C 51/10* (2013.01); *B29C 51/266* (2013.01); *B29C 51/421* (2013.01); *B29C 51/445* (2013.01); *B29C 2791/004* (2013.01); *B29C 2793/0009* (2013.01); *B29C 2793/009* (2013.01); *B29C 2793/0027* (2013.01); *B29C 2793/0036* (2013.01)

(58) Field of Classification Search
CPC ... B29C 51/261; B29C 51/262; B29C 51/266; B29C 51/268; B29C 51/421; B29C 51/445; B29C 2791/004; B29C 2793/0009; B29C 2793/0027; B29C 2793/009; B29C 2793/0036
USPC ............................................. 425/397, 403.1
See application file for complete search history.

(56) References Cited

U.S. PATENT DOCUMENTS

| | | | | |
|---|---|---|---|---|
| 4,289,469 A | * | 9/1981 | Keim | B29C 51/445 |
| | | | | 425/302.1 |
| 4,430,914 A | * | 2/1984 | Keim | B29C 51/261 |
| | | | | 83/209 |
| 2017/0144361 A1 | * | 5/2017 | Hills | B29C 51/421 |

* cited by examiner

*Primary Examiner* — Joseph S Del Sole
*Assistant Examiner* — Lawrence D. Hohenbrink, Jr.
(74) *Attorney, Agent, or Firm* — Keith D. Grzelak; Wells St. John P.S.

(57) ABSTRACT

A thermoformable sheet transfer system is provided having at least one frame, and upstream conveyor, a sheet cutter, and a downstream sheet manipulator. The upstream conveyor is configured to deliver a series of shots of formed articles in a thermoformed sheet from an exit end of an article forming station. The sheet cutter is carried by the at least one frame provided proximate the conveyor downstream of the article forming station and is configured to cut a leading edge of the formed articles and sheet sufficiently formed to index within dies of an article trim press. The downstream sheet manipulator is carried by the at least one frame and is configured to transport the leading edge and the sufficiently formed articles and sheet for delivery in sequential shots from downstream an article forming station to upstream an article trim station. A method is also provided.

33 Claims, 26 Drawing Sheets

FORMER TO TRIM PRESS AUTOMATED SHEET DELIVERY SYSTEM AND METHOD

RELATED PATENT DATA

This application claims priority to U.S. Provisional Application Ser. No. 62/611,901, which was filed on Dec. 29, 2017, the entirety of which is incorporated by reference herein.

TECHNICAL FIELD

The subject matter of this application relates to sheet delivery systems and methods for delivering formable and formed sheet. More particularly, this application relates to automated and semi-automated sheet delivery systems and methods between a thermoforming machine and a trim press.

BACKGROUND OF THE INVENTION

Sheets of thermoformed articles leaving a thermoforming trim press at times require refeeding into an entrance end of a trim press station when a source roll of thermoformable material needs to be replaced, or poorly-formed articles generate one or more shots of formed articles that will not index properly between the punch and die members, or the array of cutting dies and alignment devices on a trim press. In the past, a worker cut a clean leading edge on a sheet exiting a forming station when seemingly properly formed articles capable of being indexed were present in shots exiting the forming station. Using a hand-held cutting blade, or utility knife, a worker would cut a transverse leading edge-portion between adjacent rows of articles at a location where the articles are sufficiently well formed in a shot as to be capable of being indexed within the co-acting cutting dies of a downstream trim press. This cutting operation is necessary because formed plastic sheet has linearized polymer chains that reorient to curled or bent positions when heated. As the sheet of plastic goes through the oven, the leading edge of the sheet becomes deformed, often forming a c-shaped leading edge that needs to be cut and re-straightened when starting a new roll of sheet in a thermoforming line. However, improvements are needed in order to automate this process and to provide for such clean leading edge adjacent an index-capable array of formed articles in the sheet. Recent advances in increased operating speeds have made it nearly impossible for human operators to cut and feed such shots into a trim press during forming via intermittently moved shots. Furthermore, such a problem still exists with continuously run rotary thermoforming machines.

Attempts by a human operator to cut a sheet of thermoformed articles capable of being indexed into a trim press can cause excessive scrap and production loss. This process is further complicated for some cases where a pre-punch station is provided in between the former and the trim station, such as for punching air holes in berry containers.

Additionally, there is a danger of a person getting cut while trimming the sheet, both from a handheld cutting tool and a newly cut sheet edge. This is particularly a concern when cutting solid sheet, such as OPS, PET, APET, HIPS, and polypropylene. Manual cutting and manipulation creates a risk of operator injury.

Variation in operator physical size and skill set also complicates a hand cutting process. For example, wide sheet (such as 60" wide sheet) is difficult to cut for an operator having a relatively short arm span. The combination of holding spaced-apart lateral edges reduces the upward reach ability of the operator to raise the edge for feeding into a trim press infeed chute. Cutting of a clean leading edge on a high-speed intermittent forming machine becomes a contest of "musical chairs", often leading to an operator not being capable of making a clean cut.

Wide sheet widths further limit the upward reach of an operator when they are left grasping the opposed lateral edges of a sheet in an effort to lift up the leading edge of sheet and articles into an elevated in-feed carriage of a trim station, or trim press. This can result in a second or tertiary attempt to cut the leading edge of sheet.

Accordingly, improvements are needed to reduce operator injury, and increase speed and accuracy when feeding sheets of articles into a trim press with index capable sheets of formed articles.

SUMMARY OF THE INVENTION

A thermoformable sheet delivery system is provided between a thermoforming machine and an article trim press to manipulate index-capable shots or continuously formed arrays of articles, using an alternative rotary former, formed in a thermoformed sheet for receipt into a trim station.

According to one aspect, a thermoformable sheet transfer system is provided having at least one frame, an upstream conveyor, a sheet cutter, and a downstream sheet manipulator. The upstream conveyor is configured to deliver a series of shots of formed articles in a thermoformed sheet from an exit end of an article forming station. The sheet cutter is carried by the at least one frame provided proximate the conveyor downstream of the article forming station and is configured to cut a leading edge of the formed articles and sheet sufficiently formed to index within dies of an article trim press. The downstream sheet manipulator is carried by the at least one frame and is configured to transport the leading edge and the sufficiently formed articles and sheet for delivery downstream an article forming station to upstream an article trim station.

According to another aspect, a method is provided for transporting the leading edge of a sheet and a sufficiently formed series of shots of articles and sheet for delivery in sequential shots or in a continuous array on a sheet from at least a downstream end of an article forming station to an upstream end of an article trim station.

BRIEF DESCRIPTION OF THE DRAWINGS

Exemplary embodiments of the various disclosures are described below with reference to the following accompanying drawings. The drawings may be considered to represent scale.

DETAILED DESCRIPTION OF THE EMBODIMENTS

Figure 1:
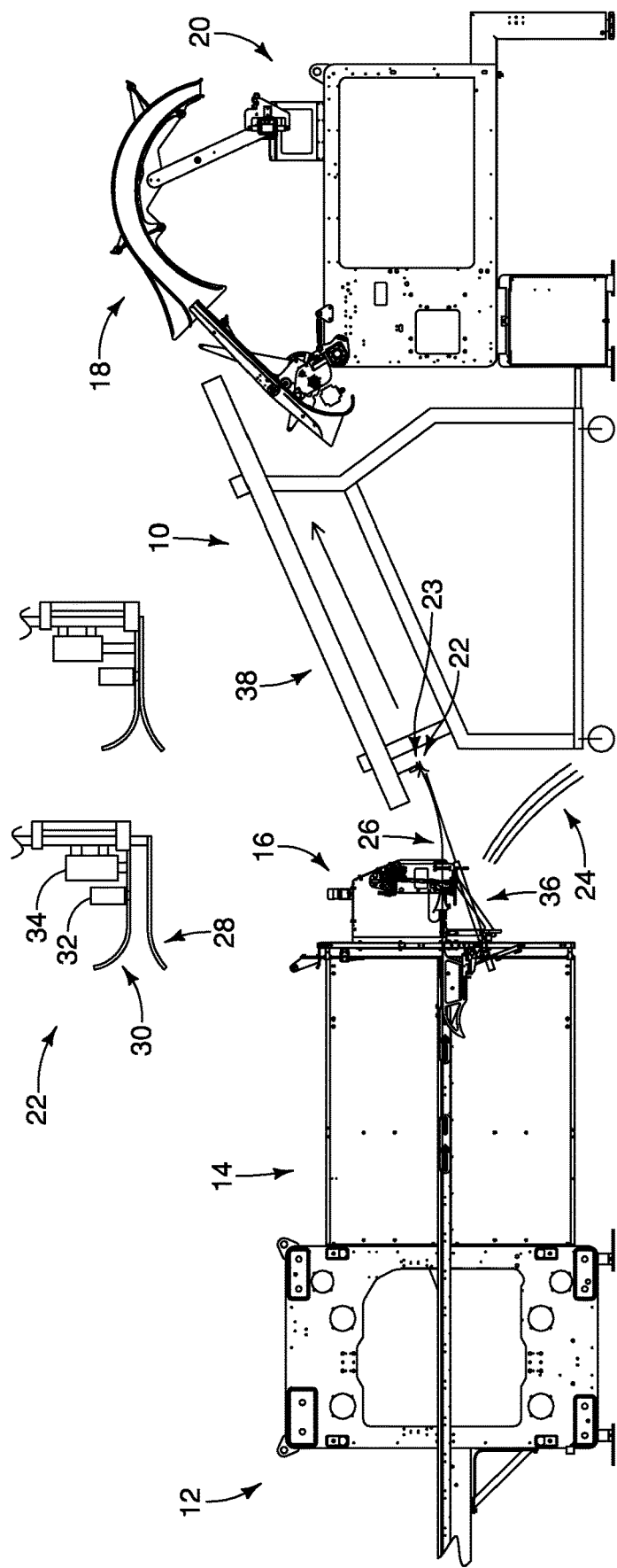
FIG. 1 is a side elevational view of an automated sheet delivery system in the form of a clamp and pull on a linear rail, according to one aspect.

This disclosure is submitted in furtherance of the constitutional purposes of the U.S. Patent Laws "to promote the progress of science and useful arts" (Article 1, Section 8).

An automated thermoformable sheet delivery apparatus 10 is shown and described below with reference to FIGS. 1-3. More particularly, the automated sheet delivery apparatus 10 is controlled via a control system (not shown) for a thermoforming line having a forming station, or thermoformer 12, a chain rail conveyor 14 downstream of former 12, a sheet cutter, or cutting apparatus 16 at a downstream end of conveyor 14, apparatus 10, a trim press infeed guide apparatus 18 and a trim press station, or trim press 20. Such a control system includes processing circuitry, memory, and control circuitry configured to control operation of each of the individual systems in a thermoforming line. In one form, a programmable logic controller (PLC) provides at least part of the control system. Left and right edge pairs of articulating sheet clamps 22 are configured to carry lateral opposed side edges of a sheet 26 of formed articles (not shown) exiting conveyor 14. Apparatus 16 eliminates need for a manual operator to cut a sheet, and will decrease injuries to a manual operator, saving time and money due to personal injury.

Pairs of left and right sheet clamp assemblies 22 each have a flared lower sheet intake guide clamp 28 and a flared upper sheet intake guide clamp 30 formed from aluminum sheet metal. Such guide clamps 28 and 30 are actuated between open, or spaced apart, and closed positions to release and clamp respective lateral edges of the sheet responsive to the control system. Optionally, clamps 28 and 30 can be formed from steel, composite, or any other suitable structural material, and can include vacuum suction cups (single or opposed vacuum effectors or suction cups), adhesive pad grippers, piercing fingers, or any other form of suitable sheet grabbing, frictionable gripping, encompassing or enveloping grip, or affixing device or mechanism suitable to engage and release with such sheet when shuttling the sheet. Clamp assemblies 22 can include guide rails, tracks or kinematic linkages that realize open and shut manipulation between clamps 28 and 30. An optical sensor 32 detects presence of a sheet between guides 28 and 30, and a pneumatic actuator, or cylinder 34 drives together guides 28 and 30 when a sheet edge is detected there between, going from a shown open position to a closed position. The optical sensor provides a feedback input to the controller, or PLC. Cylinder 34 is a linear actuator that holds clamp 28 relative to clamp 30 for linear reciprocating motion between open and closed positions. When closed, inner surfaces of clamps 28 and 30 grip a lateral edge of a sheet of formed articles. In one case, a rubber or silicon grip engagement layer is provided on clamps 28 and 30 along the flat contact portions. In other cases, clamps 28 and 30 have a smooth metal contact surface and clamp pressure between clamps 28 and 30 pinch a sheet edge during gripping and manipulating of a sheet and articles.

FIG. 1 is a side elevational view of an automated sheet delivery system 10 in the form of a clamp and pull device, or articulating sheet clamp 22 carried on a linear rail 38, according to one aspect. Linear rail 38 carries for movement between sheet cutter 16 and trim press infeed guide apparatus 18 a cross bar 23 that carries a left edge sheet clamp 22 and a right edge sheet clamp 22 at opposed ends to grip each opposed lateral edge of a sheet of articles exiting cutter 16. A leading segment 24 of scrap sheet of articles is cut from the sheet by cutter 16. Cross bar 23 is carried at a medial portion by a linear conveyor provided on an underside of linear rail 38, such as a screw drive, a pneumatic drive, a rack and gear device, a belt drive conveyor, or any other suitable conveyance device. A sheet clamp 22 is carried at opposed ends configured to grip and manipulate a corresponding lateral edge of a sheet of thermoformed articles.

An extendable/retractable sheet end shuttle 36 clamps lateral edges of the newly cut sheet and shuttles, or conveys the newly cut leading end to clamps 22 on automated sheet delivery system 10. Once the sheet is loaded into clamps 22, sheet end shuttle 36 retracts back beneath cutter 16. Optionally, shuttle 36 can be replaced with a retractable guide system. Further optionally, optical detection systems can be added to facilitate identification of article/sheet position for guiding and for identifying product quality to further identify index capable sheet and articles which provides feedback control signals to the control system.

Trim press infeed guide apparatus 18 includes a photo eye and laterally opposed sheet edge clamp wheels comprising a drive wheel and an idler wheel configured to grab and move the sheet of articles.

Figure 2:
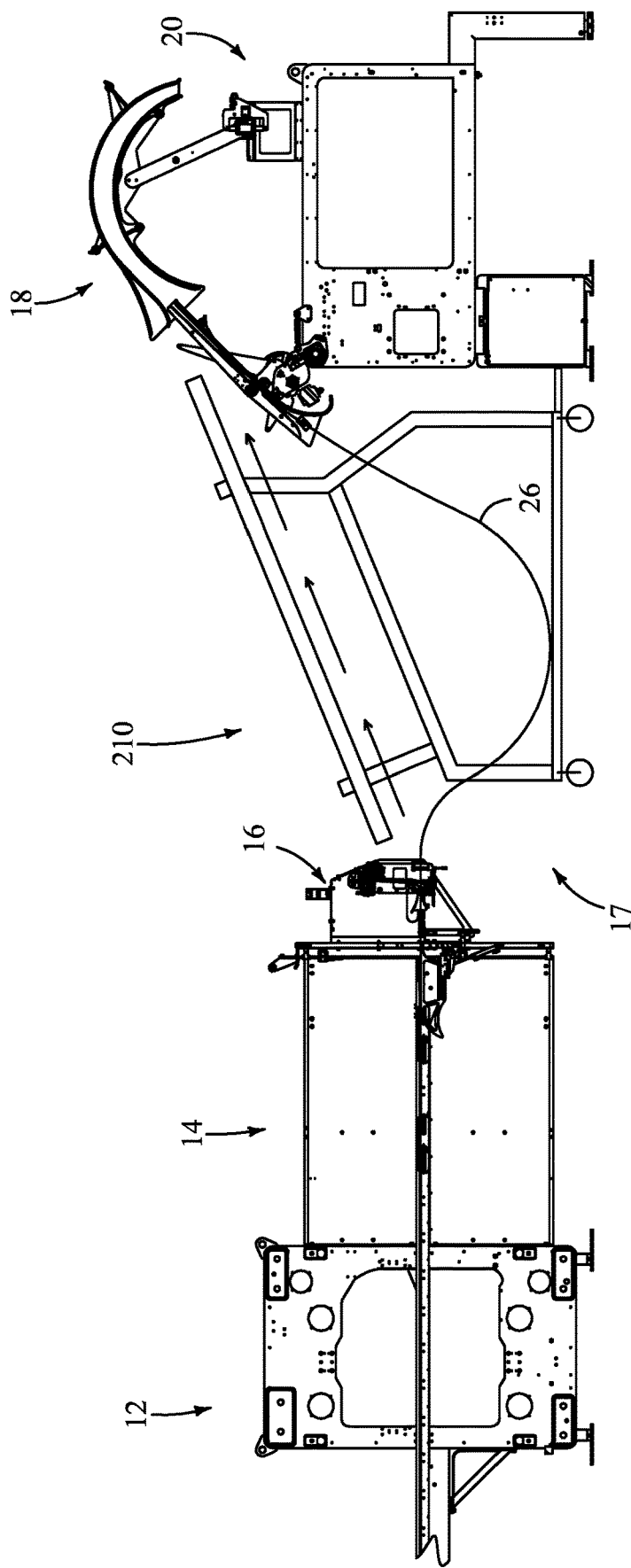
FIG. 2 is a side elevational view of the system of FIG. 1 showing a sheet being delivered to an entrance of a trim press.

As shown is FIG. 2, the sheet is clamped in clamps 22 at an upstream end of system 10. As linear rail 38 moves clamps 22 and sheet downstream and up, the cylinders of shuttle 36 are retracted and the sheet 26 forms a natural loop, or accumulation from cutter 16 that stores sheet before being fed into infeed guide apparatus 18 for delivery into trim press 20. An accumulator 17 is provided by apparatus 10 including the sheet end shuttle 36 and the trim press in-feed guide apparatus 18.

FIG. 2 is a side elevational view of the system of FIG. 1 showing a sheet being delivered to an entrance of a trim press.

Figure 3:
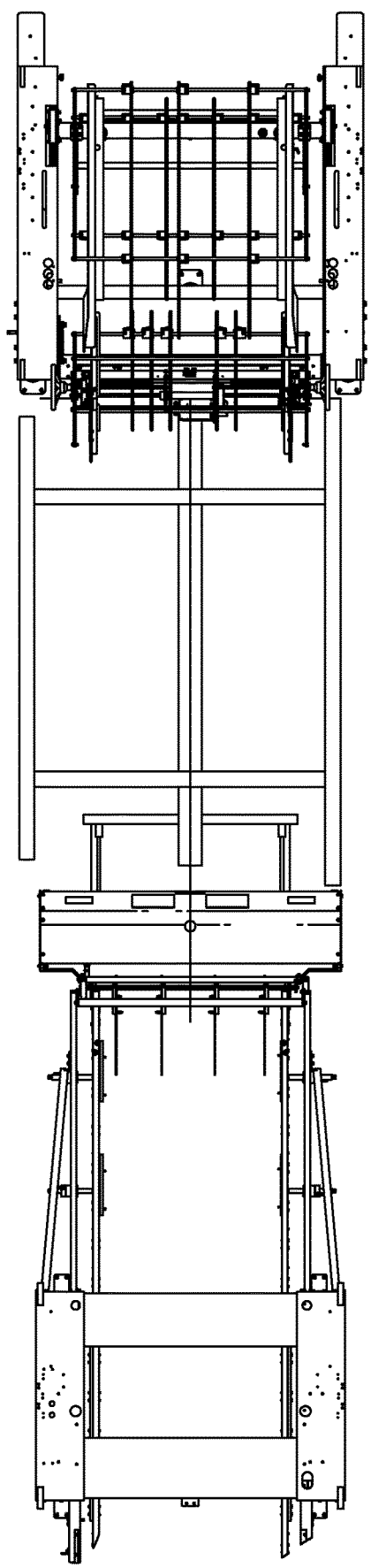
FIG. 3 is a plan view from above of the system of FIGS. 1-2.

FIG. 3 is a plan view from above of the system 10 of FIGS. 1-2.

Figure 4:
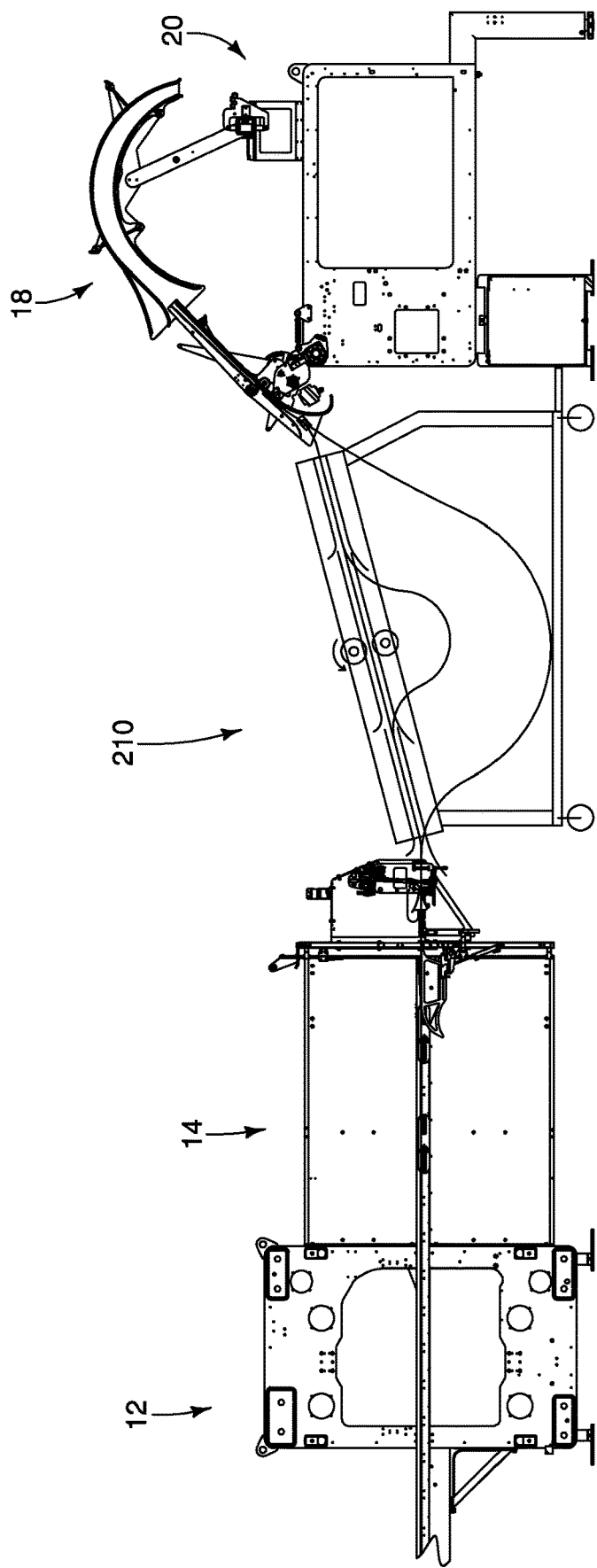
FIG. 4 is a side elevational view of an automated sheet delivery system in the form of actuating rails with a servo helper, according to a second aspect.

FIG. 4 is a side elevational view of an automated sheet delivery system in the form of actuating rails with a servo helper, according to a second aspect.

Figure 5:
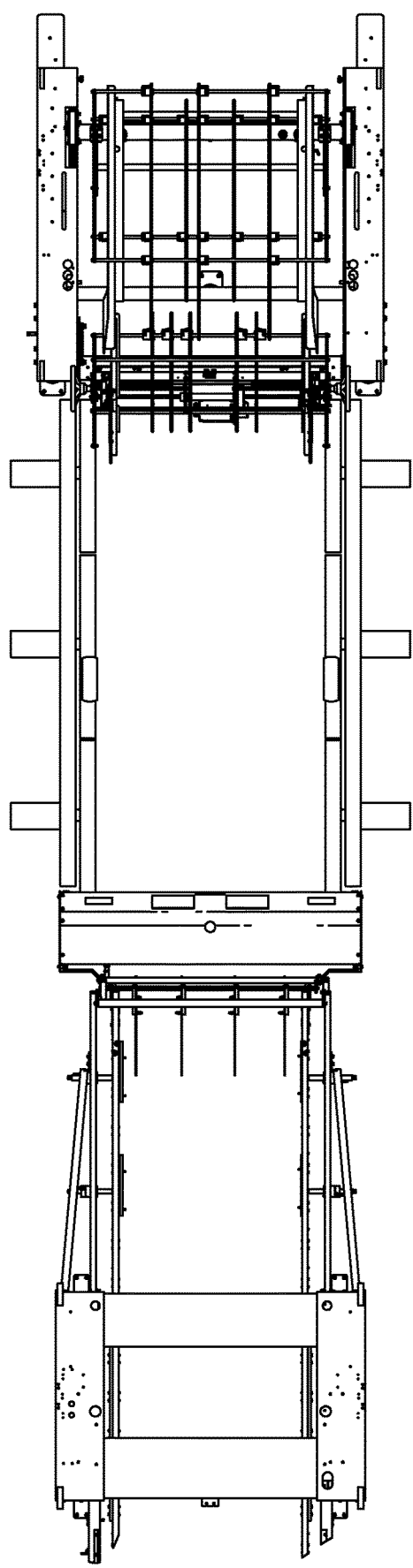
FIG. 5 is a plan view from above of the system of FIG. 4 showing a full open position.

FIG. 5 is a plan view from above of the system of FIG. 4 showing a full open position.

Figure 6:
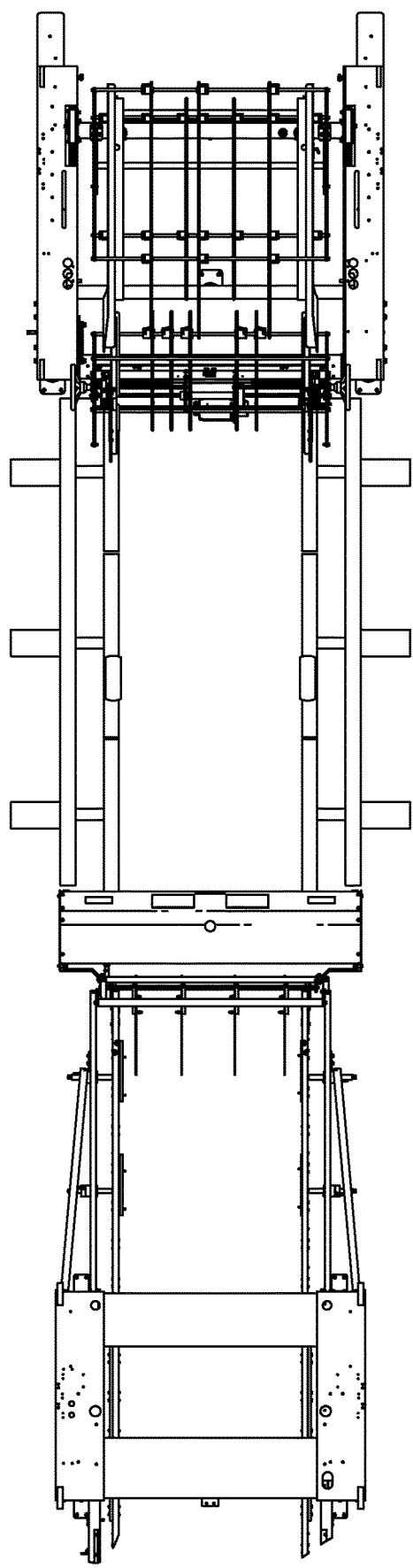
FIG. 6 is a plan view from above of the system of FIGS. 4-5 showing a full engaged position.

FIG. 6 is a plan view from above of the system of FIGS. 4-5 showing a full engaged position.

Figure 7:
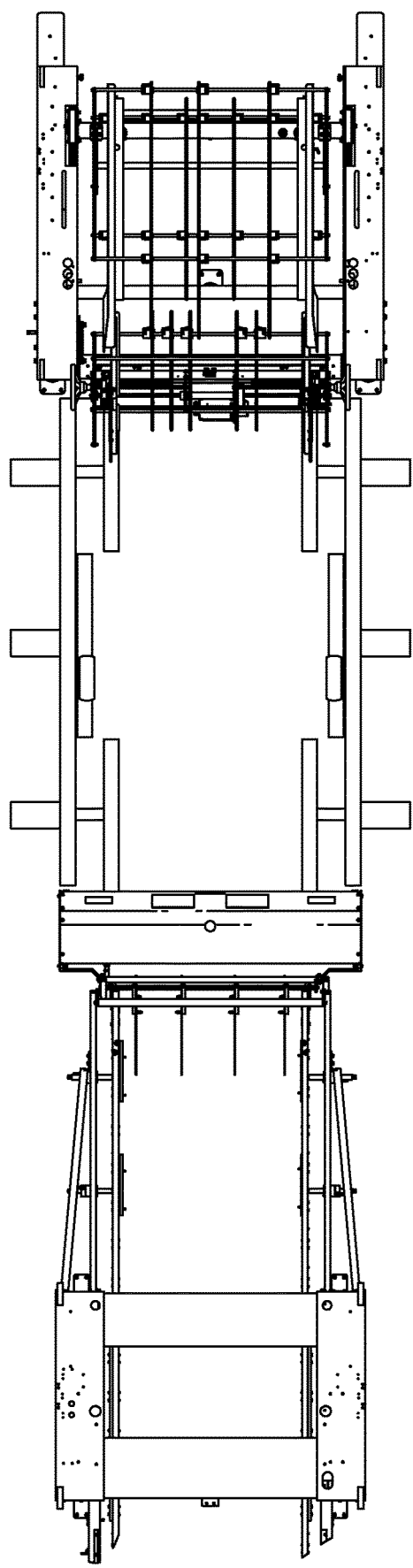
FIG. 7 is a plan view from above of the system of FIG. 4 showing a loop producing position.

FIG. 7 is a plan view from above of the system of FIG. 4 showing a loop producing position.

Figure 8:
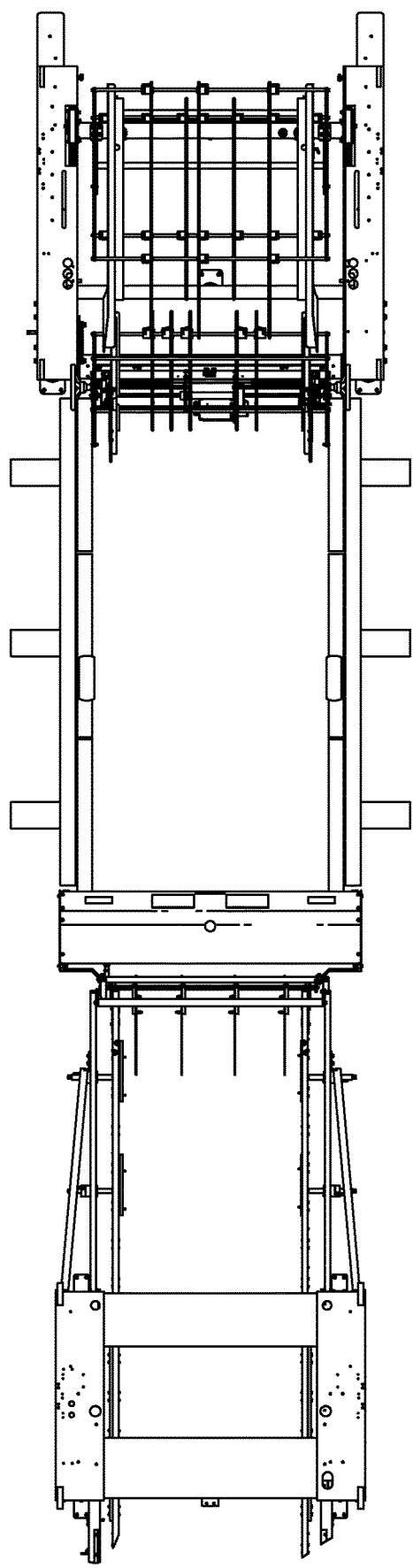
FIG. 8 is a plan view from above of the system of FIGS. 4-5 showing a full loop/capture rate position.

FIG. 8 is a plan view from above of the system of FIGS. 4-5 showing a full loop/capture rate position.

Figure 9:
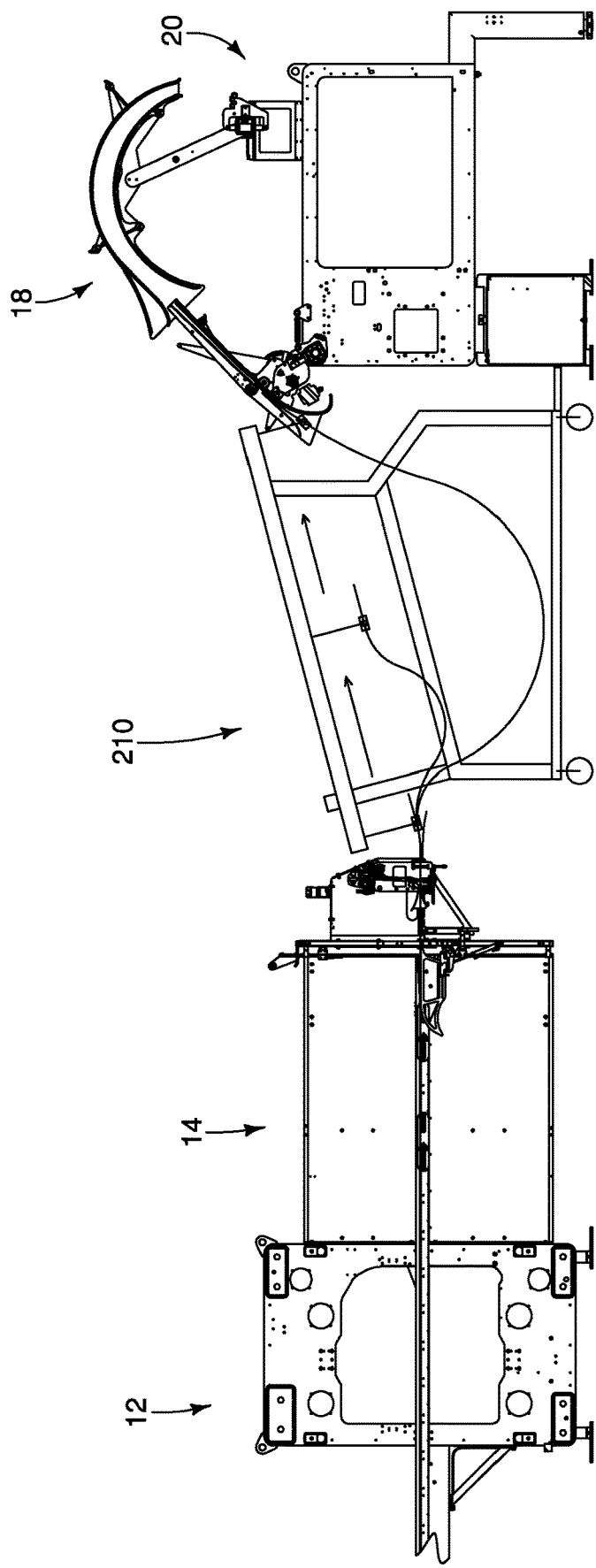
FIG. 9 is a side elevational view of an automated sheet delivery system in the form of side clamping with rails, according to a third aspect.

FIG. 9 is a side elevational view of an automated sheet delivery system 210 in the form of side clamping with rails, according to a third aspect.

Figure 10:
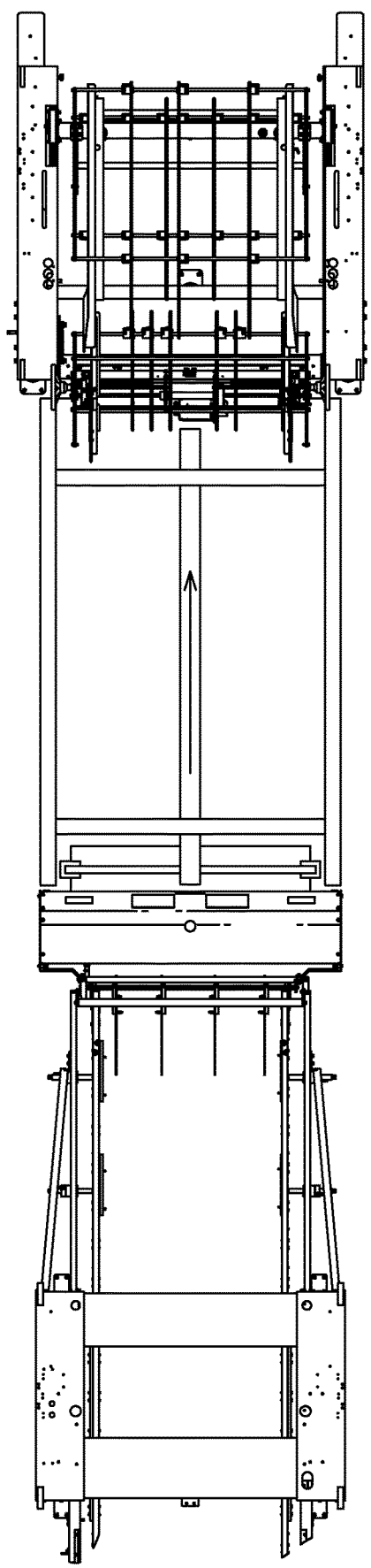
FIG. 10 is a side elevational view of the system of FIG. 4 showing a sheet being delivered to an entrance of a trim press.

FIG. 10 is a plan view of the system of FIG. 4 showing a sheet being delivered to an entrance of a trim press having a single longitudinal drive assembly.

Figure 11:
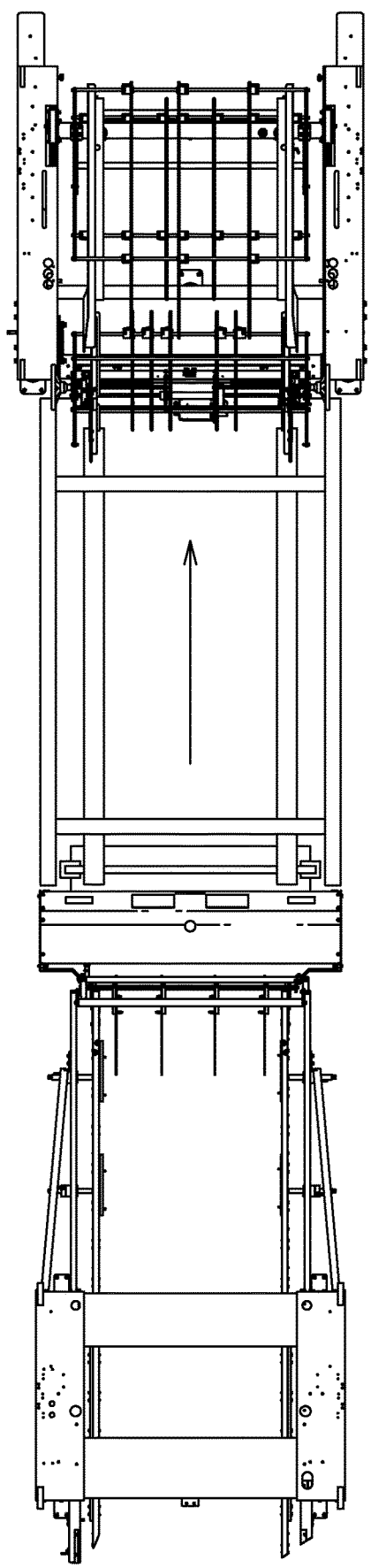
FIG. 11 is a plan view from above of the system of FIGS. 4-5.

FIG. 11 is a plan view from above of the system of FIGS. 4-5 having a pair of laterally spaced apart longitudinal drive assemblies.

Figure 12:
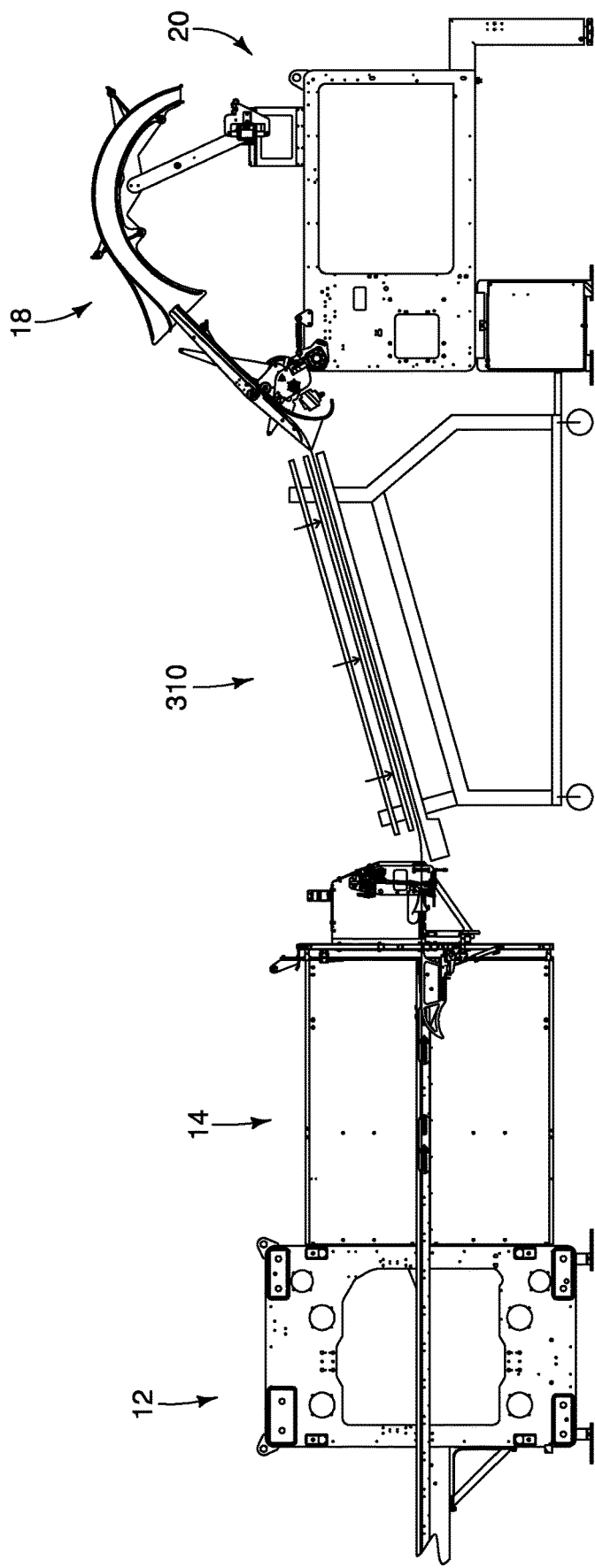
FIG. 12 is a side elevational view of an automated sheet delivery system in the form of an open chain rail system, according to a fourth aspect.

FIG. 12 is a side elevational view of an automated sheet delivery system 310 in the form of an open chain rail system, according to a fourth aspect.

Figure 13:
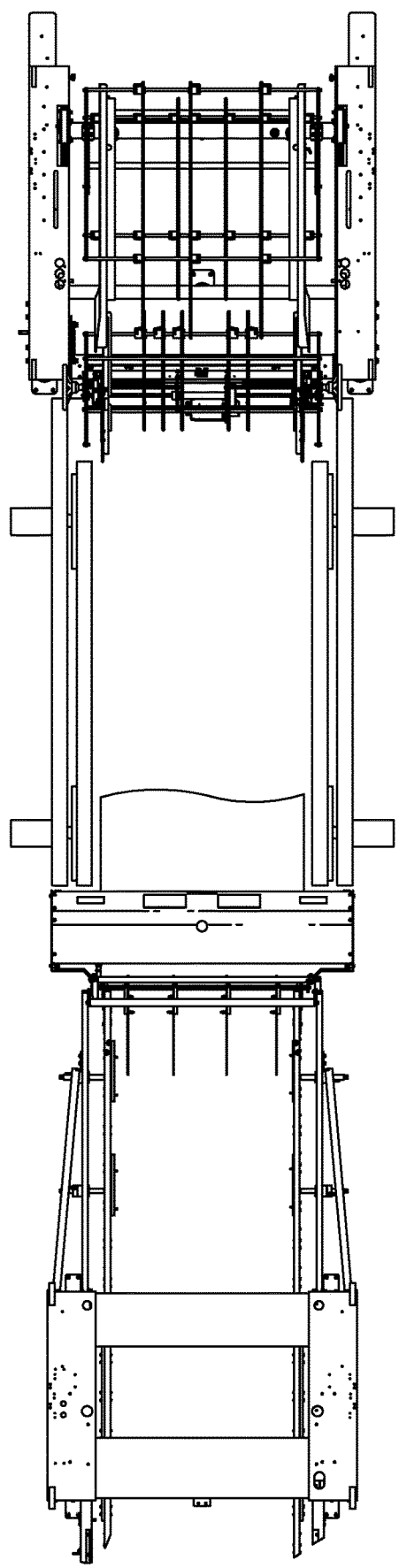
FIG. 13 is a plan view from above of the system of FIG. 12 showing the chain rails retracted.

FIG. 13 is a plan view from above of the system of FIG. 12 showing the chain rails retracted.

Figure 14:
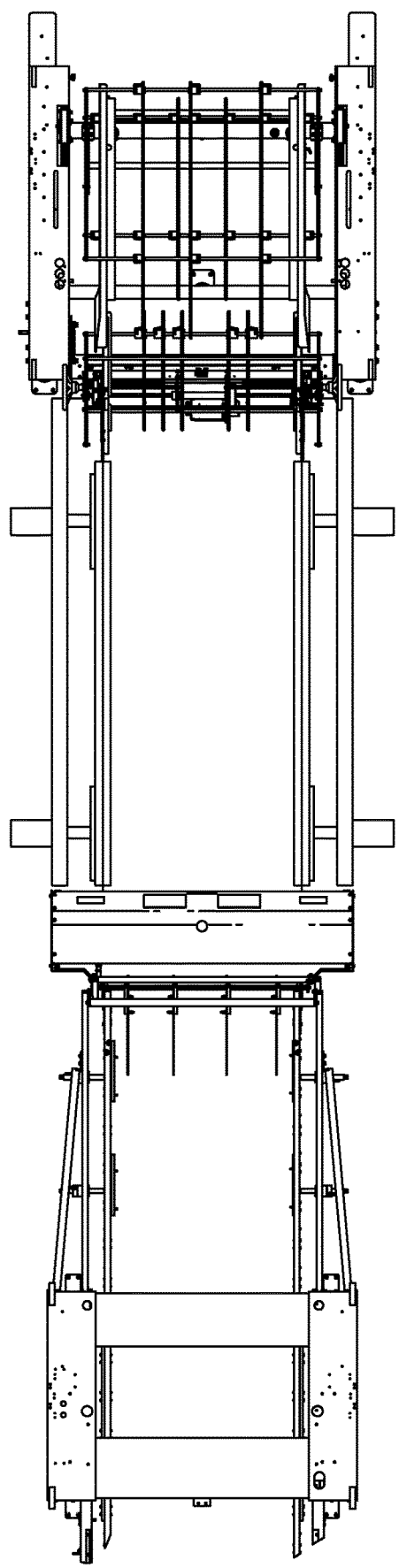
FIG. 14 is a plan view from above of the system of FIGS. 12-13 showing the chain rails extended and moved into position.

FIG. 14 is a plan view from above of the system of FIGS. 12-13 showing the chain rails extended and moved into position.

Figure 15:
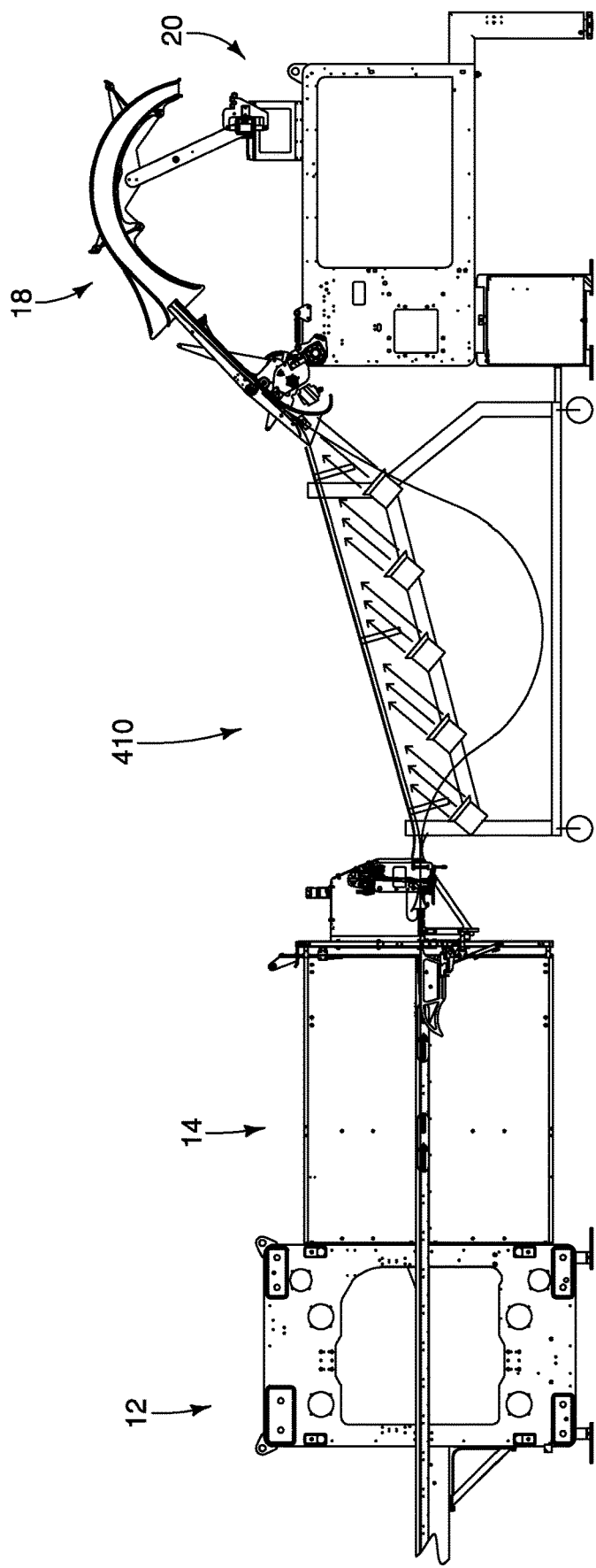
FIG. 15 is a side elevational view of an automated sheet delivery system in the form of an air-driven guide product form down system, according to a fifth aspect.

FIG. 15 is a side elevational view of an automated sheet delivery system 410 in the form of an air-driven guide product form down system, according to a fifth aspect. An array of laterally retractable pneumatic fans from below are positioned to direct the fans to blow the sheet in a downstream direction to feed the web to the next machine, the trim press infeed guide apparatus 18. Optionally, a top frame (not shown) is provided above the sheet to guide the sheet as it is blown in a downstream direction.

Figure 16:
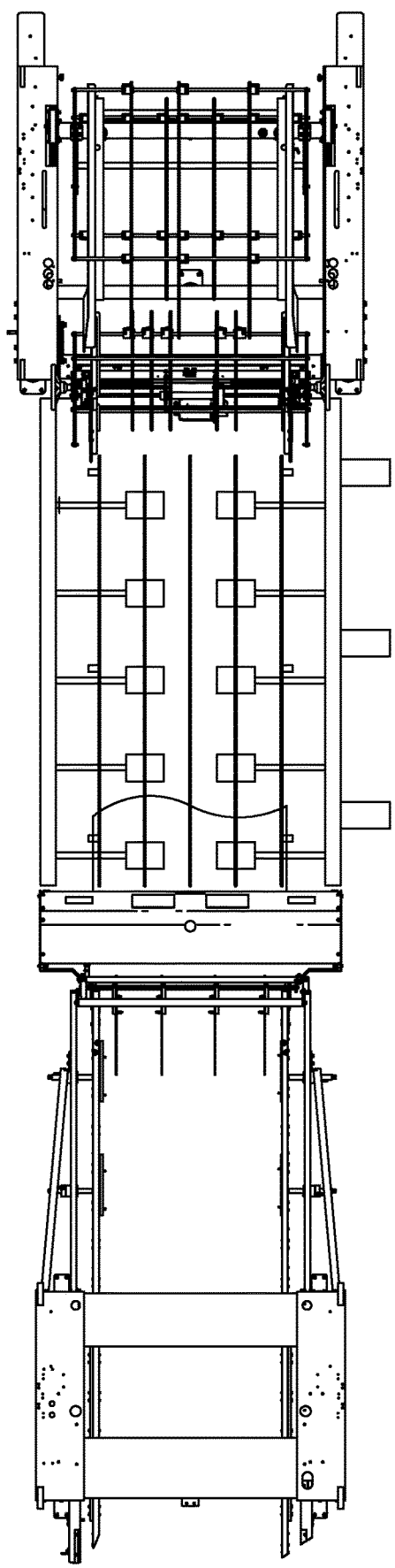
FIG. 16 is a plan view from above of the system of FIG. 15.

FIG. 16 is a plan view from above of the system of FIG. 15.

Figure 17:
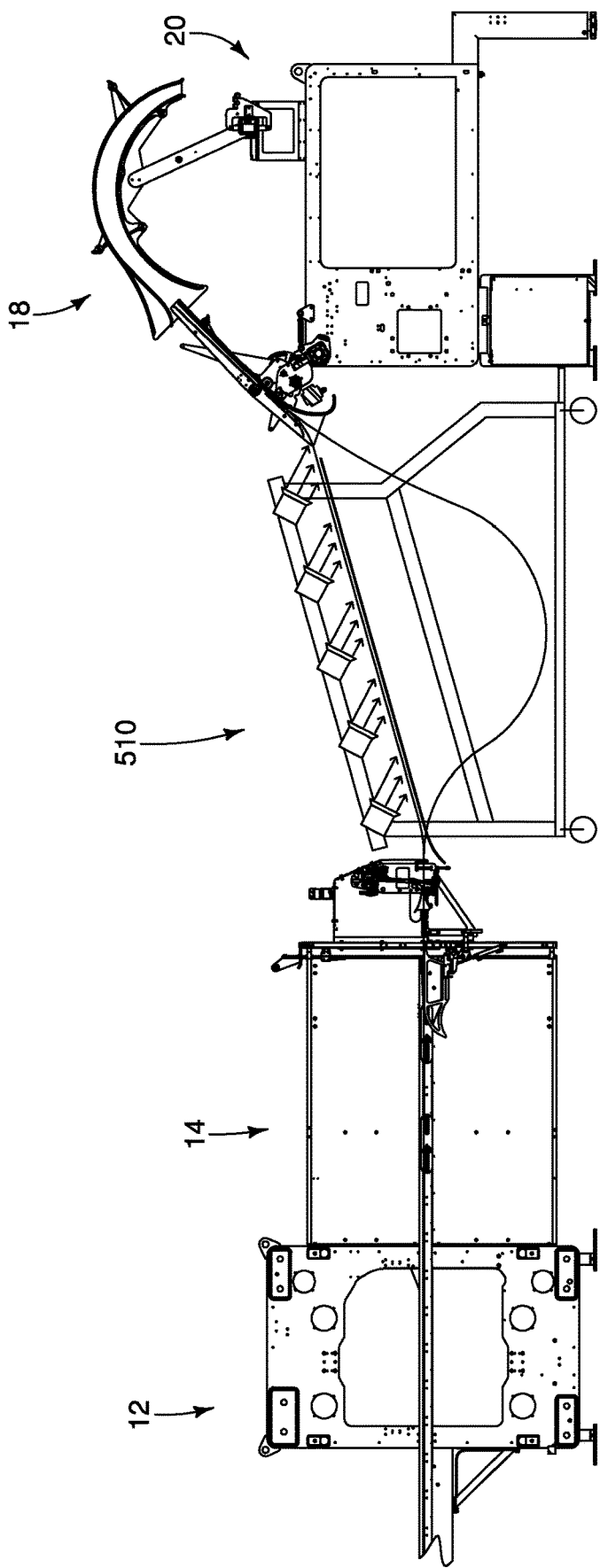
FIG. 17 is a side elevational view of an automated sheet delivery system in the form of an air-driven guide product form up system, according to a sixth aspect.

FIG. 17 is a side elevational view of an automated sheet delivery system 510 in the form of an air-driven guide product form up system, according to a sixth aspect. An array of laterally retractable pneumatic fans from above are positioned to direct the fans to blow the sheet in a downstream direction to feed the web to the next machine, the trim press infeed guide apparatus 18. In addition, a lower support frame is used to prevent the sheet from touching the ground when being moved (not shown).

Figure 18:
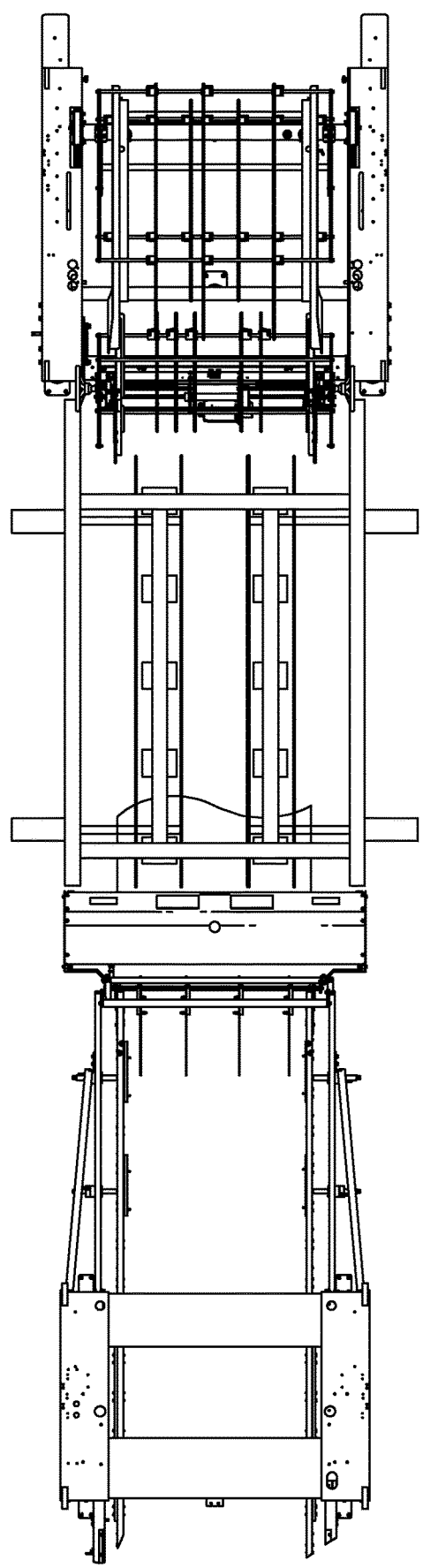
FIG. 18 is a plan view from above of the system of FIG. 17.

FIG. 18 is a plan view from above of the system of FIG. 17.

Figure 19:
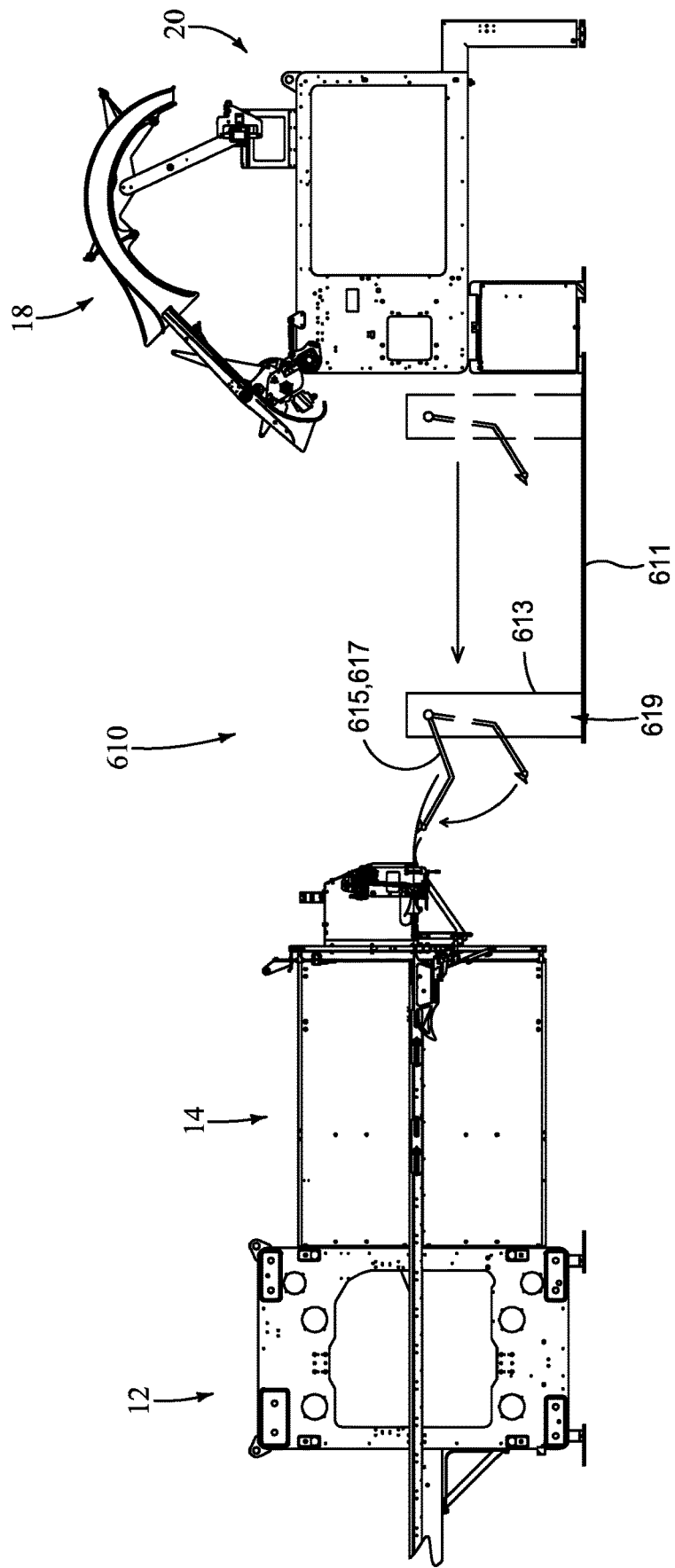
FIG. 19 is a side elevational view of an automated sheet delivery system in the form of a PLC driven robot, according to a seventh aspect.

FIG. 19 is a side elevational view of an automated sheet delivery system 610 in the form of a programmable logic control (PLC) driven robot, according to a seventh aspect. More particularly, a robotic shuttle, or robot 610 is configured to translate along a factory floor, or frame 611 to grasp and convey a newly cut, leading edge of sheet 26 and articles from a downstream end of a cutter and chain rail conveyor to an entrance end of a trim press station. Robot 610 includes an upright frame 613 with a pair of laterally spaced apart kinematic arms 615, 617, each with an edge gripper similar to clamp assembly 22 (of FIG. 1). Robot 610 includes an array of four spaced-apart wheels, or rollers 619 that track along a pair of longitudinal rails to enable robot 610 to translate and shuttle the leading edge of sheet from the cutter to a trim press infeed guide apparatus 18 and a trim press station 20. Optionally, robot 610 can be an autonomous robot with powered wheels or tracks that enable translation of the robot to shuttle the leading end of the cut sheet and formed articles to the infeed guide apparatus 18.

Figure 20:
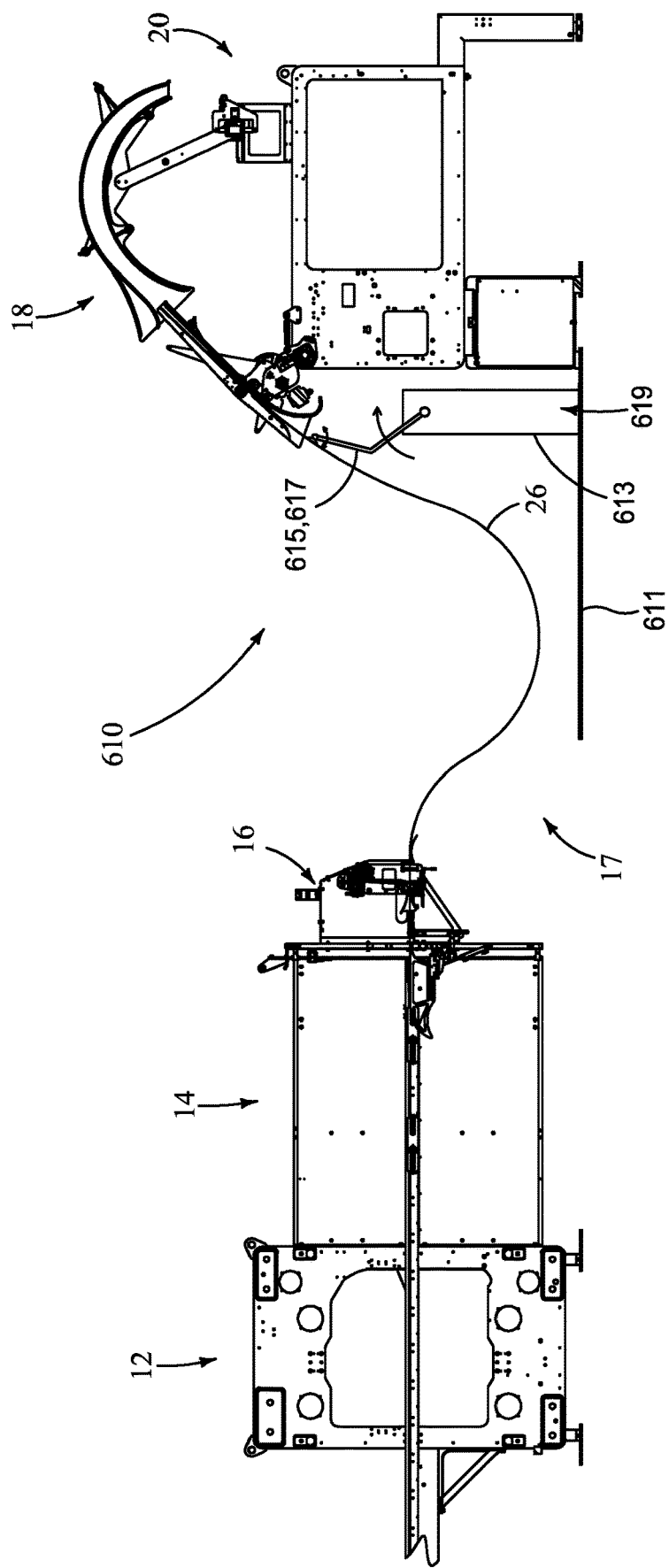
FIG. 20 is a side elevational view of the system of FIG. 19 showing the robot delivering the sheet and articles to an upstream end of a trim press.

FIG. 20 is a side elevational view of the system of FIG. 19 showing the robot delivering the sheet and articles to an upstream end of a trim press. Wheels 619 have translated along factory floor, or frame 611, and frame 613 has moved kinematic arms 615, 617 to position sheet 26.

Figure 21:
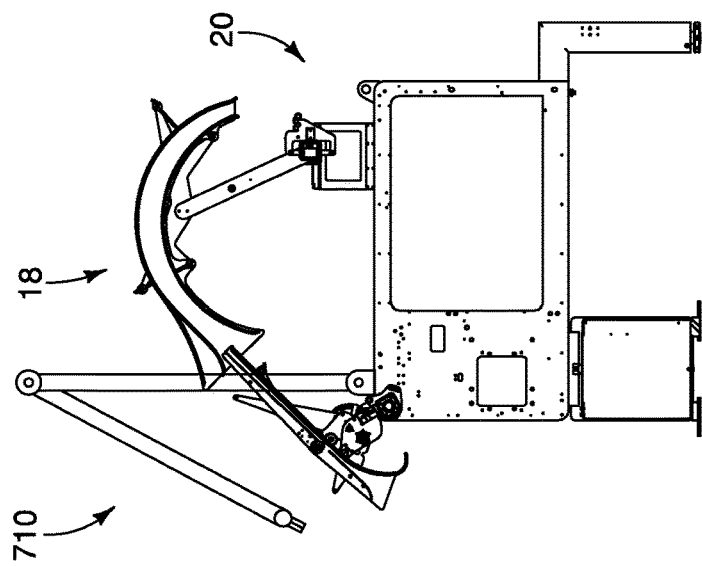
FIG. 21 is a side elevational view of an automated sheet delivery system in the form of a pivotable arm mounted to a trim station and optionally to ground or a form station, according to a ninth aspect.
Figure 21:
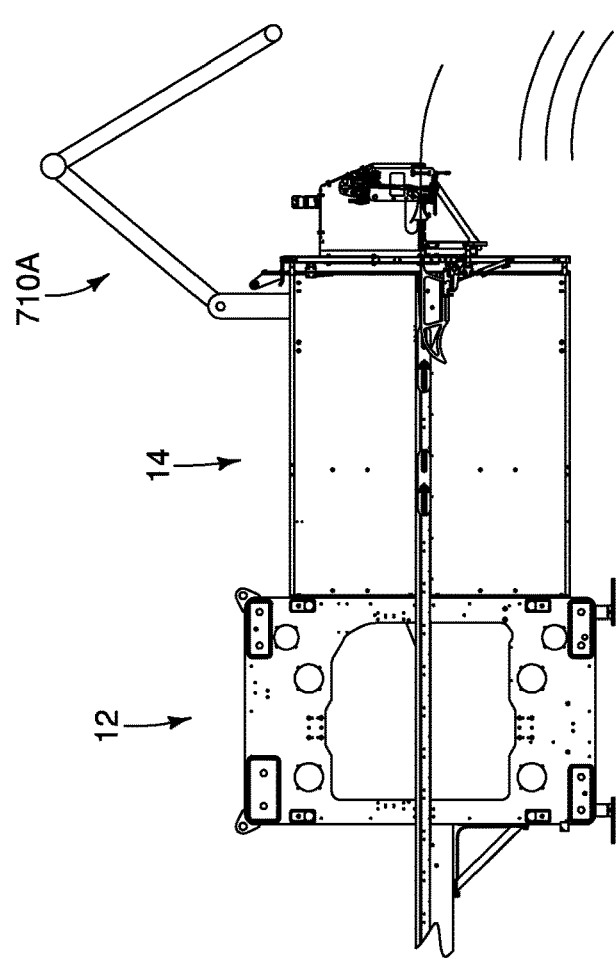

FIG. 21 is a side elevational view of an automated sheet delivery system, or pivotable arm assembly 710 in the form of a pivotable, articulating arm mounted to a trim station, according to a ninth aspect. Pivotable arm 710 is mounted to a frame on a trim press. Optionally, pivotable arm 710A is mounted to a frame for a chain rail conveyor or to the protective cage for the chain rail conveyor. Further optionally, pivotable arm 710 can be mounted on a stand-alone frame on a factory floor. Such pivotable arms 710 and 710A each comprise an articulating kinematic linkage having one or more controlled motion motors, such as a servo drive motor, capable of articulating the arm to grab and move each side edge of sheet of articles. A base arm servo motor and an elbow servo motor coordinate to articulate a pair of elongate arms to position an end-effect gripper, or clamp to articulate and move a sheet of articles. The end-effect gripper can be driven by a servo motor, or by an articulating control motor. Optionally, each of the articulating joints can be implemented with an AC motor having a physical sensor feedback loop or a DC motor with a physical sensor feedback loop that can be used to accurately control motion of the arm(s). A distal end of each arm includes a clamp member configured with a pair of opposed clamp plates that engage and disengage to grip and release a lateral edge of a sheet of articles during manipulation or movement of the sheet from a forming station and cutter to a trim station.

Figure 22:
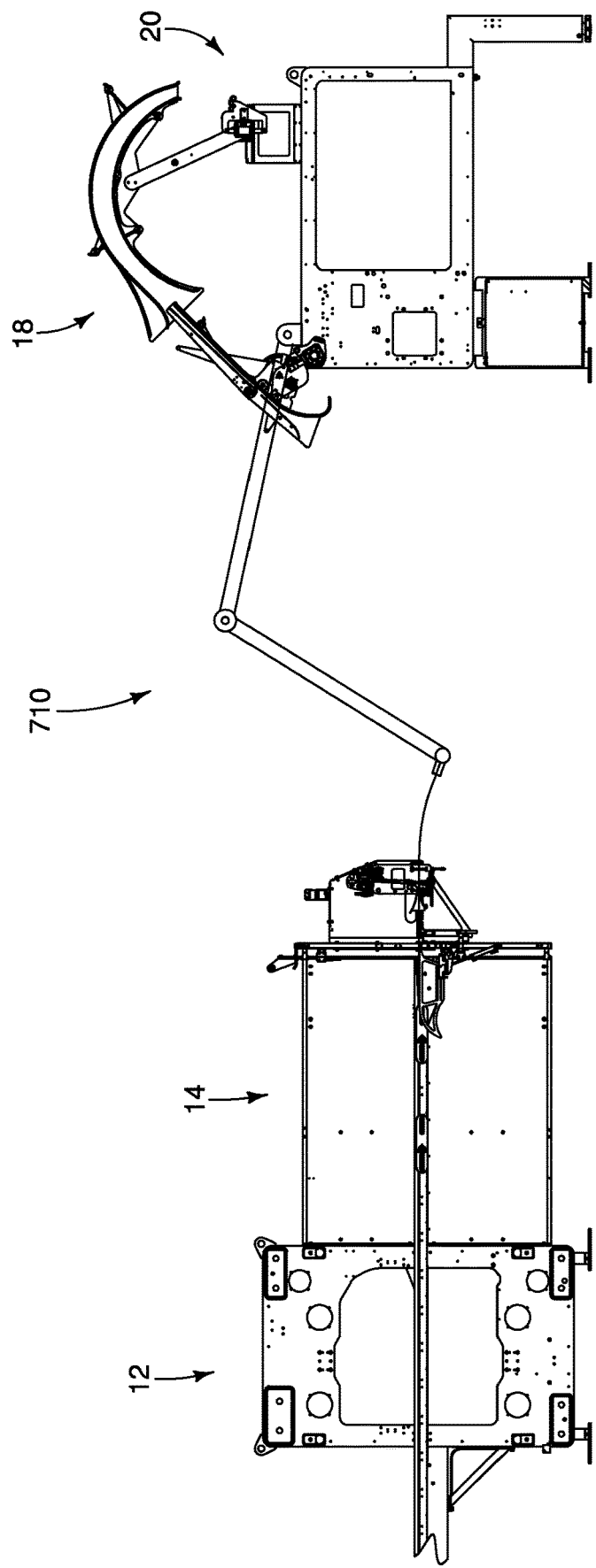
FIG. 22 is a side elevational view of the system of FIG. 21 showing the pivotable arm extended from the trim station to clamp a sheet and articles.

FIG. 22 is a side elevational view of the system of FIG. 21 showing the pivotable arm extended from the trim station to clamp a sheet and articles.

Figure 23:
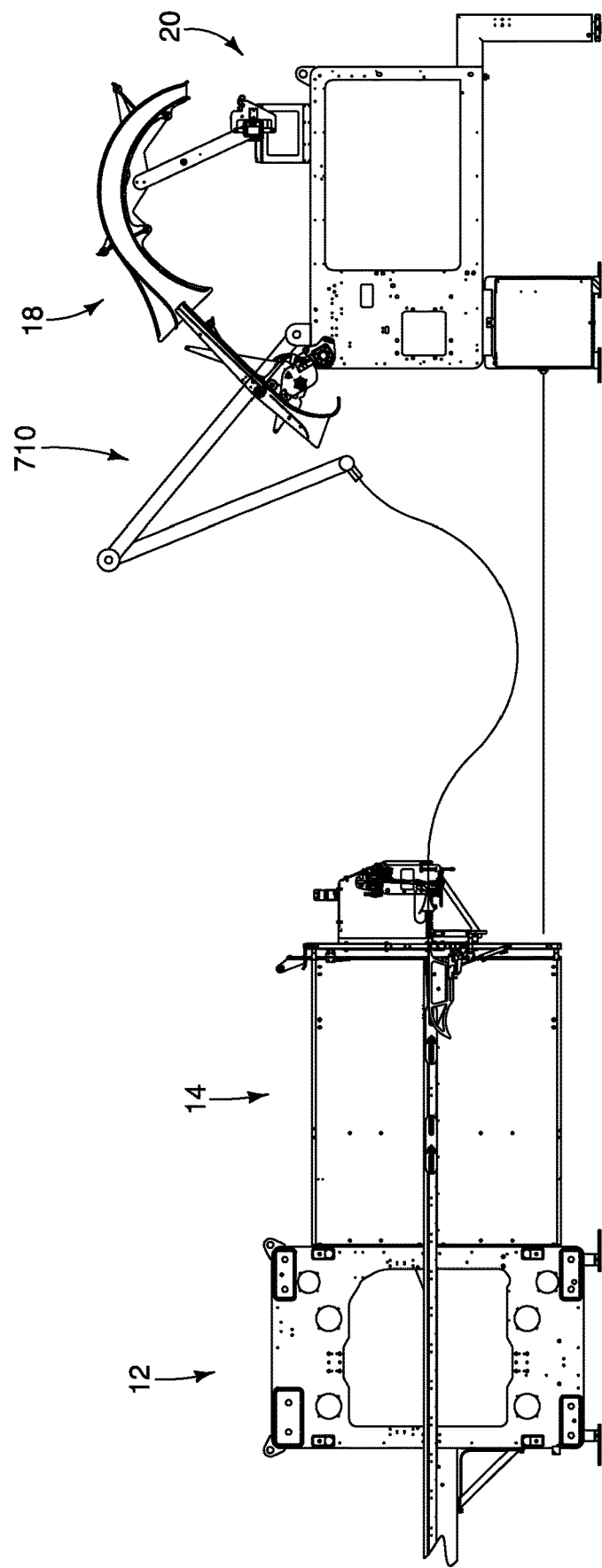
FIG. 23 is a side elevational view of the system of FIGS. 21 and 22 showing the arm drawing the sheet and articles toward the trim station.

FIG. 23 is a side elevational view of the system of FIGS. 21 and 22 showing the arm drawing the sheet and articles toward the trim station.

Figure 24:
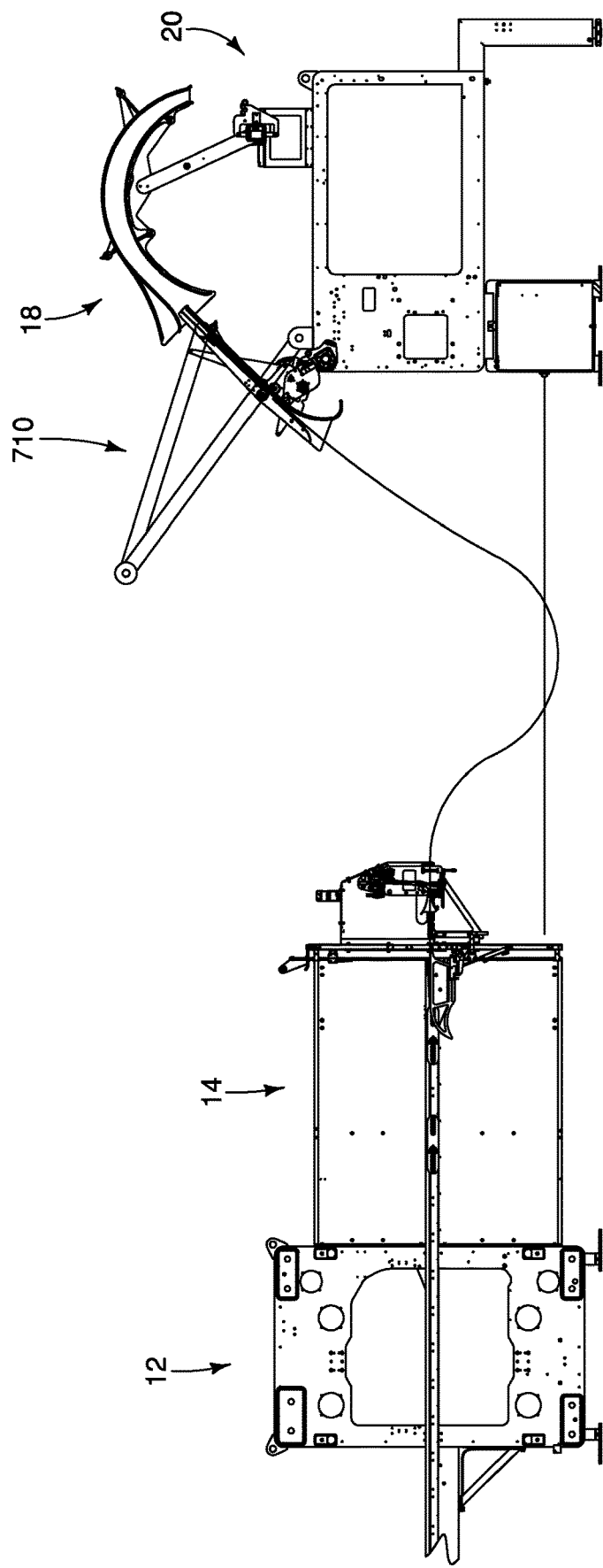
FIG. 24 is a side elevational view of the system of FIGS. 21-23 showing the arm with the sheet and articles received into the trim station infeed.

FIG. 24 is a side elevational view of the system of FIGS. 21-23 showing the arm with the sheet and articles received into the trim station infeed.

Figure 25:
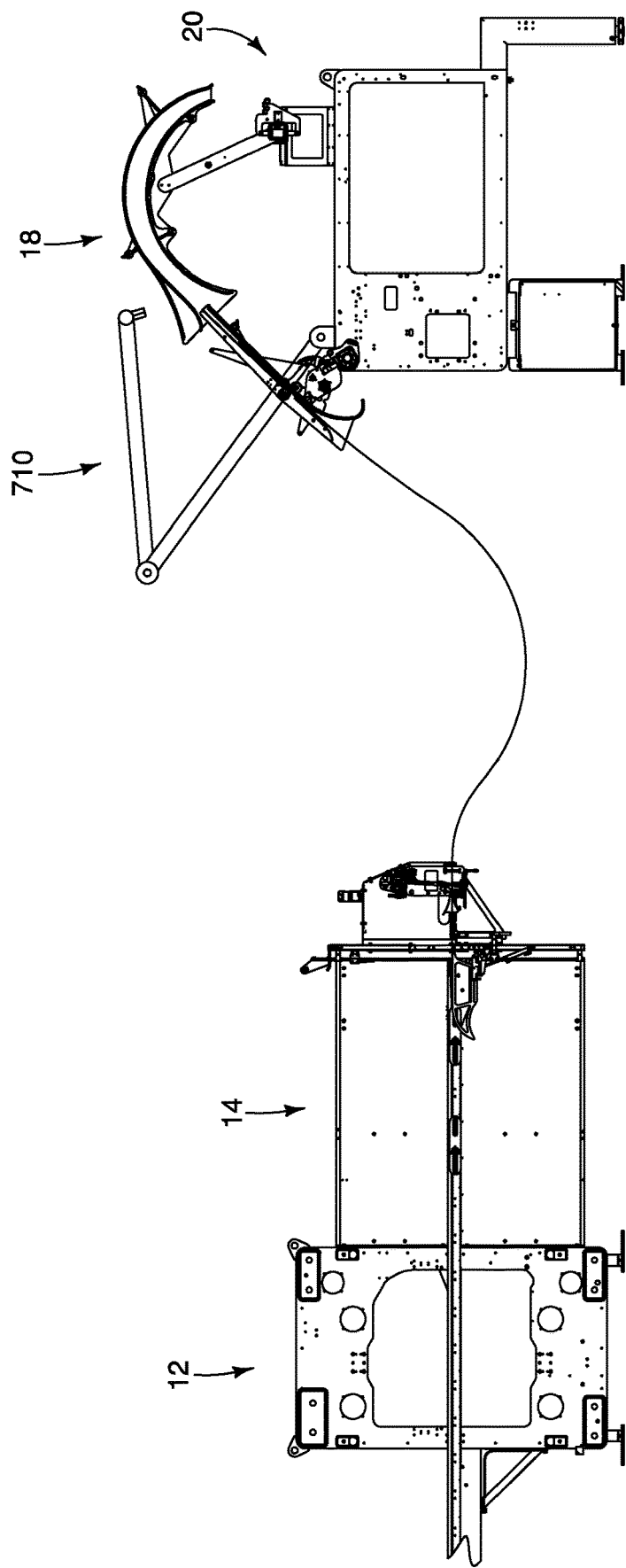
FIG. 25 is a side elevational view of the system of FIGS. 21-24 showing the arm stowed after feeding the sheet and articles to the trim station.

FIG. 25 is a side elevational view of the system 710 of FIGS. 21-24 showing the arm stowed after feeding the sheet and articles to the trim station.

Figure 26:
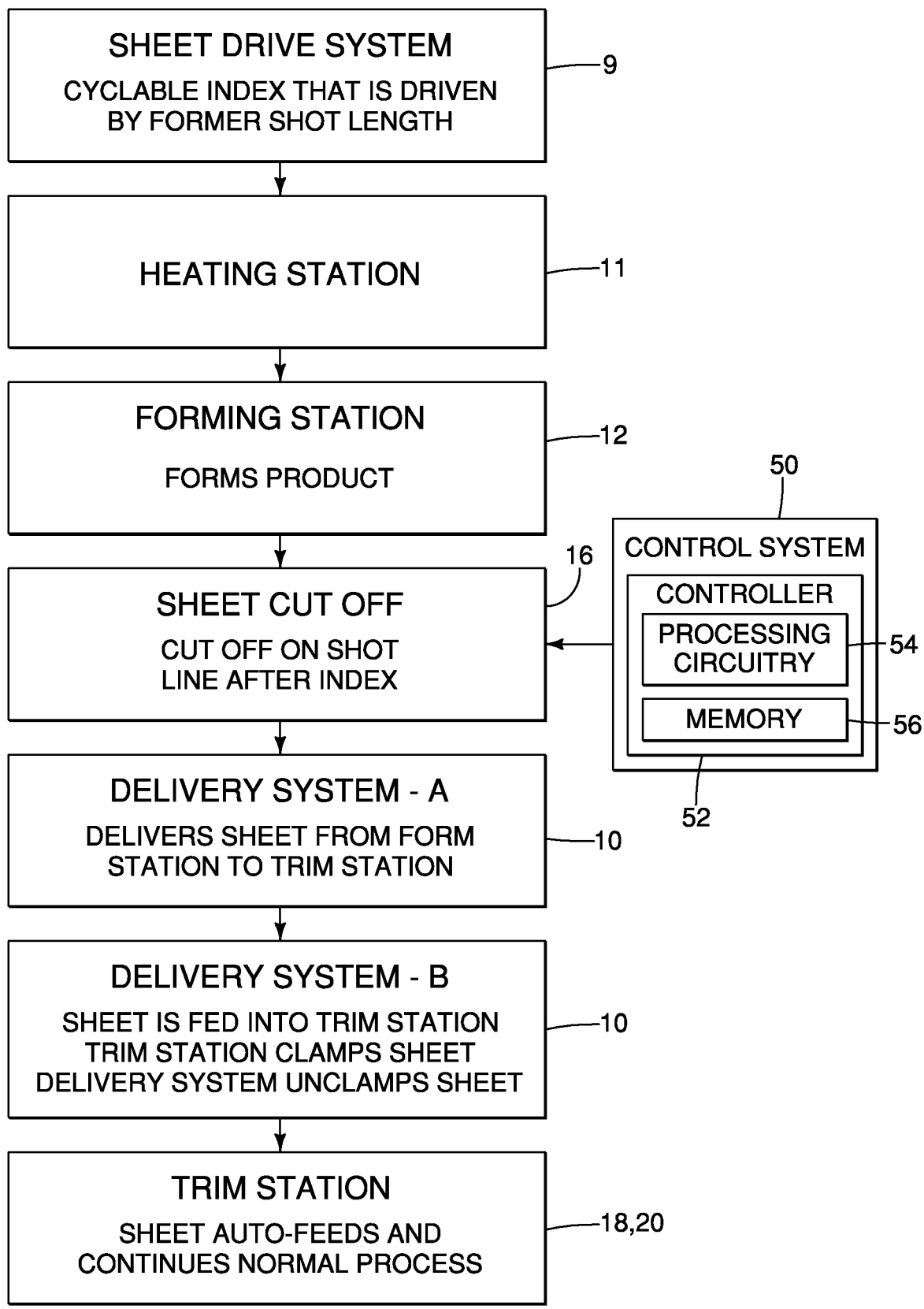
FIG. 26 is a functional block diagram illustrating functional units for an automated and semi-automated sheet cut off and sheet delivery system and method between a thermoforming machine and a trim press.

FIG. 26 is a functional block diagram illustrating functional units for an automated and semi-automated sheet cut off and sheet delivery system and method between a thermoforming machine and a trim press. More particularly, a sheet drive system 9 moves a sheet of thermoformable material intermittently with a cyclable index that is drive in a manner that relates to or matches a former shot length of former 12 (see FIG. 1). Sheet drive system 9 includes chain rail conveyor 14 (see FIG. 1). The sheet drive system 9 moves the sheet intermittently through a heating station, or over 11. The sheet then intermittently moves through a forming station, or former 12 (see FIG. 1). Sheet cutter 16 cuts off the sheet on a shot line after an index motion stops movement in order to provide a perpendicular and straight leading edge of the sheet adjacent a new shot of formed articles. Such newly cut straight edge remedies sheet distortion generated by a combination of heat delivery to a previously formed sheet of plastic or foam material that tends to shrink when heated and which is constrained by a pair of conveyor rails along each lateral edge. A control system 50, in one case integrated into a thermoforming line control system, includes a controller 52 having processing circuitry 54 and memory 56 that controls operation of sheet cut off machine, or sheet cutter 16. A sheet delivery system 10 includes a first Part A and a second, subsequent Part B. Sheet delivery system Part A is configured to delivery the sheet from the form station to the trim station. Sheet delivery system Part B is configured to feed the delivered sheet into the trim station where the trim station clamps onto the sheet on each lateral opposed edge and the delivery system then unclamps the sheet after delivering the sheet to the trim station. Optionally, mid-line drive and follower wheels can also be used on the top and bottom of the sheet between rows of formed product to move the sheet and formed product. The trim station comprises a trim press infeed guide apparatus 18 and a trim press station, or trim press 20 and is configured to receive the delivered, leading edge cut sheet via an automatic sheet feed and continuous normal process.

Although this sheet delivery system has been taught for use between a forming station and a trim press, it is understood that it could also optionally or additionally be implemented between a sheet source and an entrance end of a conveyor, or conveyor system.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

While the subject matter of this application was motivated in addressing transfer and/or conveyance of shots of thermoformed sheet and articles from a forming station to a trim station on a thermoforming line, it is in no way so limited. The disclosure is only limited by the accompanying claims as literally worded, without interpretative or other limiting reference to the specification, and in accordance with the doctrine of equivalents.

Other aspects and implementations are contemplated.

In compliance with the statute, the various embodiments have been described in language more or less specific as to structural and methodical features. It is to be understood, however, that the various embodiments are not limited to the specific features shown and described, since the means herein disclosed comprise disclosures of putting the various embodiments into effect. The various embodiments are, therefore, claimed in any of its forms or modifications within the proper scope of the appended claims appropriately interpreted in accordance with the doctrine of equivalents.

What is claimed is:

1. A thermoformable continuous sheet conveyance system, comprising:
   at least one frame;
   an upstream conveyor configured to deliver a series of contiguous shots of formed articles in a thermoformed sheet from an exit end of an article forming station;
   a sheet cutter carried by the at least one frame provided proximate the conveyor downstream of the article forming station and configured to cut a leading edge of the series of contiguous shots of formed articles and sheet sufficiently formed to index within dies of an article trim press;
   a downstream sheet manipulator carried by the at least one frame configured to transport the leading edge and the sufficiently formed articles and sheet for delivery downstream of the article forming station to upstream of an article trim station; and
   an accumulator carried by the at least one frame and configured to accumulate a plurality of the contiguous shots of formed articles for delivery to the article trim station.

2. The apparatus of claim 1 further comprising a sensor configured to detect location of the leading edge of the series of contiguous shots of formed articles and sheet relative to the article trim station.

3. The apparatus of claim 2, wherein the sensor is an optical sensor.

4. The apparatus of claim 3, wherein the downstream sheet manipulator comprises a servo motor and a sheet holding mechanism, and further comprising a control system communicating with the servo motor and configured to drive the carrier in timed synchronization with operation of the upstream article forming station and the downstream article trim station.

5. The apparatus of claim 1, wherein the at least one frame comprises at least one of a chain rail frame and a trim press frame.

6. The apparatus of claim 1, wherein the downstream sheet manipulator comprises a robotic shuttle configured to translate, grasp, and convey a newly cut, leading edge of the sheet and articles from a downstream end of the cutter and chain rail conveyor to an entrance end of the trim press frame.

7. The apparatus of claim 6, wherein the robotic shuttle is a robot having an upright frame, a pair of laterally spaced apart kinematic arms, and a pair of clamp assemblies one provided on each kinematic arm.

8. The apparatus of claim 7, wherein the robot further comprises an array of spaced-apart wheels configured to track along a pair of stationary longitudinal rails configured to translate and shuttle the leading edge of the cut sheet to a trim press infeed guide apparatus.

9. A thermoformable continuous sheet conveyance system, comprising:
   at least one frame;
   an upstream conveyor configured to deliver a series of contiguous shots of formed articles in a thermoformed sheet from an exit end of an article forming station;
   a downstream sheet manipulator carried by the at least one frame configured to transport a leading edge of the sheet for delivery downstream of the article forming station to upstream of an article trim station; and a sheet accumulator carried by the at least one frame and configured to accumulate a plurality of the contiguous shots of formed articles for delivery to the article trim station.

10. The apparatus of claim 9, further comprising a sheet cutter carried by the at least one frame provided proximate the conveyor downstream of the article forming station and configured to cut the leading edge of the series of contiguous shots of formed articles and sheet sufficiently formed to index within dies of an article trim press.

11. The apparatus of claim 9, further comprising a sensor configured to detect location of the leading edge of the series of contiguous shots of formed articles and sheet relative to the article trim station.

12. The apparatus of claim 11, wherein the sensor is an optical sensor.

13. The apparatus of claim 12, wherein the downstream sheet manipulator comprises a robotic shuttle configured to translate, grasp, and convey a newly cut, leading edge of the sheet and articles from a downstream end of a cutter and a chain rail conveyor to an entrance end of a trim press frame.

14. The apparatus of claim 13, wherein the robotic shuttle is a robot having an upright frame, a pair of laterally spaced apart kinematic arms, and a pair of clamp assemblies one provided on each kinematic arm.

15. The apparatus of claim 14, wherein the robot further comprises an array of spaced-apart wheels configured to track along a pair of stationary longitudinal rails configured to translate and shuttle the leading edge of the cut sheet to a trim press infeed guide apparatus.

16. The apparatus of claim 9, wherein the sheet accumulator comprises a sheet end shuttle and a trim press in-feed guide apparatus.

17. The apparatus of claim 1, wherein the at least one frame is a robot frame configured to carry the downstream manipulator.

18. The apparatus of claim 1, wherein the at least one frame is a former frame configured to carry the downstream manipulator.

19. The apparatus of claim 1, wherein the downstream manipulator is provided by a robot configured to translate on a track.

20. The apparatus of claim 19, wherein the track comprises at least one longitudinal rail configured to enable the robot to translate the leading edge of the sheet.

21. The apparatus of claim 19, wherein the track is a factory floor.

22. The apparatus of claim 21, wherein the robot includes wheels configured to enable the robot to translate along the factory floor.

23. The apparatus of claim 9, wherein the downstream manipulator comprises an autonomous robot and a control system configured to deliver the leading edge of the sheet from a form station to a trim station.

24. The apparatus of claim 9, wherein the sheet delivery system comprises at least one linear rail having at least one sheet edge clamp have a drive wheel coacting with an idler wheel to move the leading edge of the cut sheet to the article trim station, and the sheet accumulator is a natural loop of the sheet between the cutter and the feed guide of the trim press while the at least one linear rail is laterally outwardly retracted.

25. The apparatus of claim 9, wherein the sheet delivery system comprises a natural loop formed in the sheet extending from the cutter to the trim press.

26. The apparatus of claim 9, wherein the sheet delivery system comprises a pair of substantially parallel outer actuating rails and a servo helper motor configured to drive the sheet.

27. The apparatus of claim 9, wherein the sheet delivery system comprises a pair of side clamping rails, a single central longitudinal sheet leading edge drive assembly and respective laterally spaced apart drive assemblies.

28. The apparatus of claim 9, wherein the sheet delivery system comprises a pair of sheet edge engaging chain rails movable between sheet engaged and retracted positions.

29. The apparatus of claim 9, wherein the sheet delivery system comprises an array of laterally retractable pneumatic fans provided beneath the sheet in an article form-down operation and configured to air-drive the sheet in a downstream direction to the trim press.

30. The apparatus of claim 9, wherein the sheet delivery system comprises an array of laterally retractable pneumatic fans provided above the sheet and a lower support frame provided beneath the sheet in an article form-up operation and configured to air-drive the sheet in a downstream direction to the trim press.

31. The apparatus of claim 9, wherein the sheet delivery system comprises a robot having at least one sheet edge gripper configured to grip and transfer the leading edge of the sheet from the cutter and the chain rail to the trim press.

32. The apparatus of claim 9, wherein the sheet delivery system comprises at least one articulating arm comprising an articulating kinematic linkage having an end-effect gripper/clamp to clamp and move the sheet and pivotally affixed to one of the at least one frame.

33. The apparatus of claim 32, wherein the one frame comprises a trim press frame, a chain rail frame, a protective cage frame, and a stand-alone frame on a factory floor.

* * * * *